United States Patent
Isaksen et al.

(10) Patent No.: US 7,477,708 B1
(45) Date of Patent: Jan. 13, 2009

(54) MODES OF OPERATIONS IN QAM MODEMS

(75) Inventors: David Bruce Isaksen, Mountain View, CA (US); Mark Fong, San Jose, CA (US)

(73) Assignee: Wideband Semiconductors, Inc., Mountain View, CA (US)

( * ) Notice: Subject to any disclaimer, the term of this patent is extended or adjusted under 35 U.S.C. 154(b) by 363 days.

(21) Appl. No.: 11/404,521

(22) Filed: Apr. 15, 2006

Related U.S. Application Data

(62) Division of application No. 10/734,415, filed on Dec. 11, 2003, now abandoned.

(51) Int. Cl.
*H03D 3/22* (2006.01)
*H04L 27/22* (2006.01)

(52) U.S. Cl. .................. 375/332; 375/222; 375/230; 375/233; 375/261; 375/326

(58) Field of Classification Search ......... 375/229–236, 375/261–167, 298, 326, 332
See application file for complete search history.

(56) References Cited

U.S. PATENT DOCUMENTS

| | | | | |
|---|---|---|---|---|
| 4,871,973 A | * | 10/1989 | Yoshihara | 329/308 |
| 6,115,433 A | * | 9/2000 | de Lantremange | 375/326 |
| 6,904,098 B1 | | 6/2005 | Isaksen et al. | |
| 2002/0067764 A1 | * | 6/2002 | Kindler et al. | 375/222 |
| 2004/0005022 A1 | * | 1/2004 | Zhu et al. | 375/365 |
| 2004/0105396 A1 | * | 6/2004 | Eudes et al. | 370/277 |

* cited by examiner

*Primary Examiner*—Curtis B Odom
(74) *Attorney, Agent, or Firm*—Boris G. Tankhilevich

(57) ABSTRACT

The method of selecting an optimum mode of operation of the QAM modem comprising (A) using a host interface to select a pair of states, the first state being an initial state; the second state being an intermediate state; and (B) causing a state machine to progress from the initial state to a final state via the intermediate state to optimize the performance of the QAM modem.

1 Claim, 5 Drawing Sheets

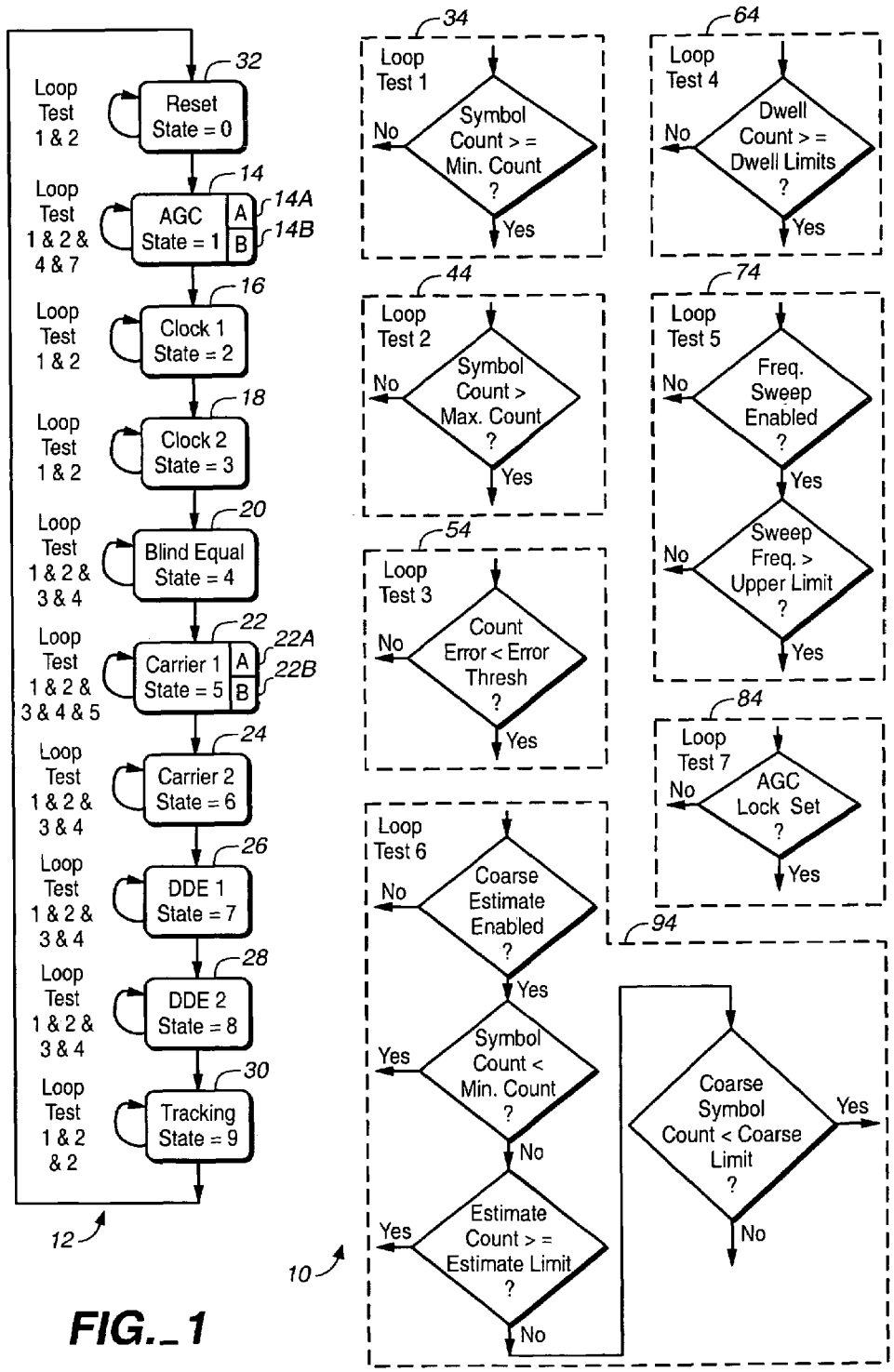
FIG._1

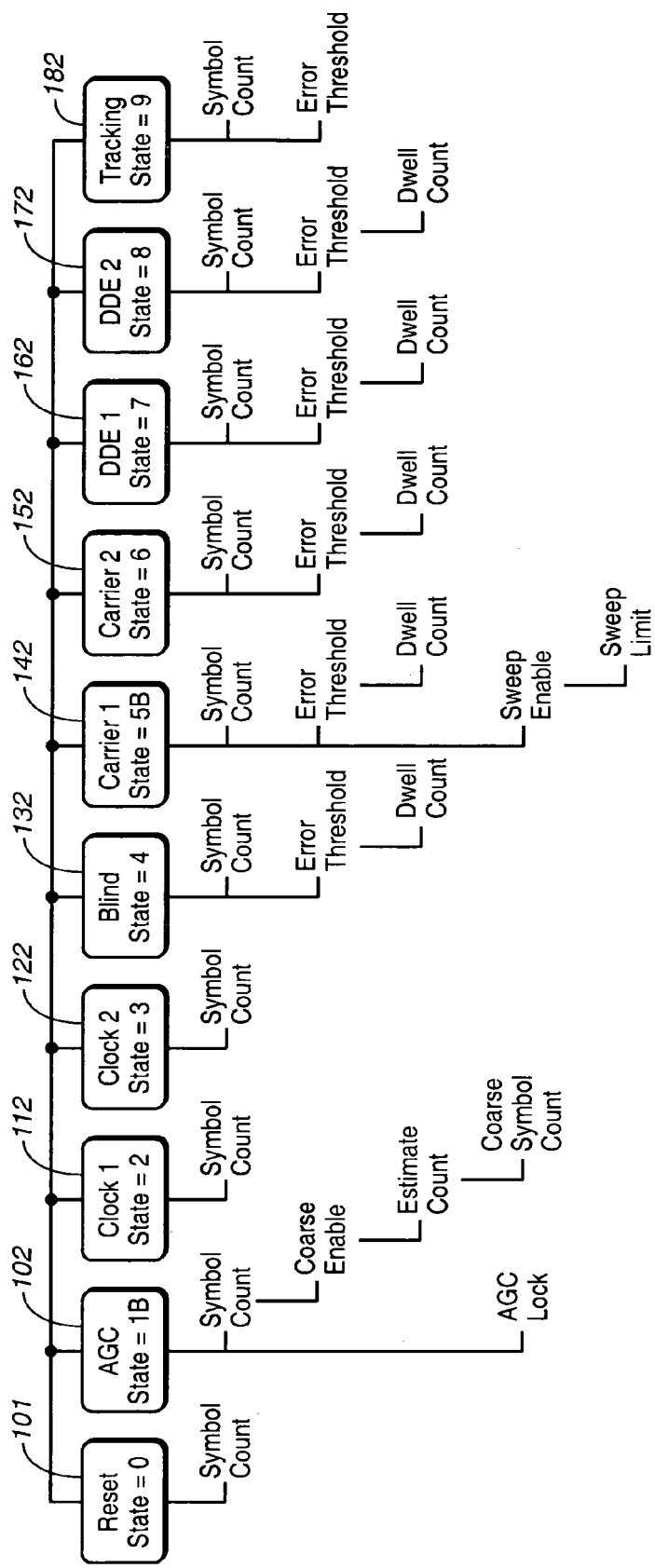
FIG._2

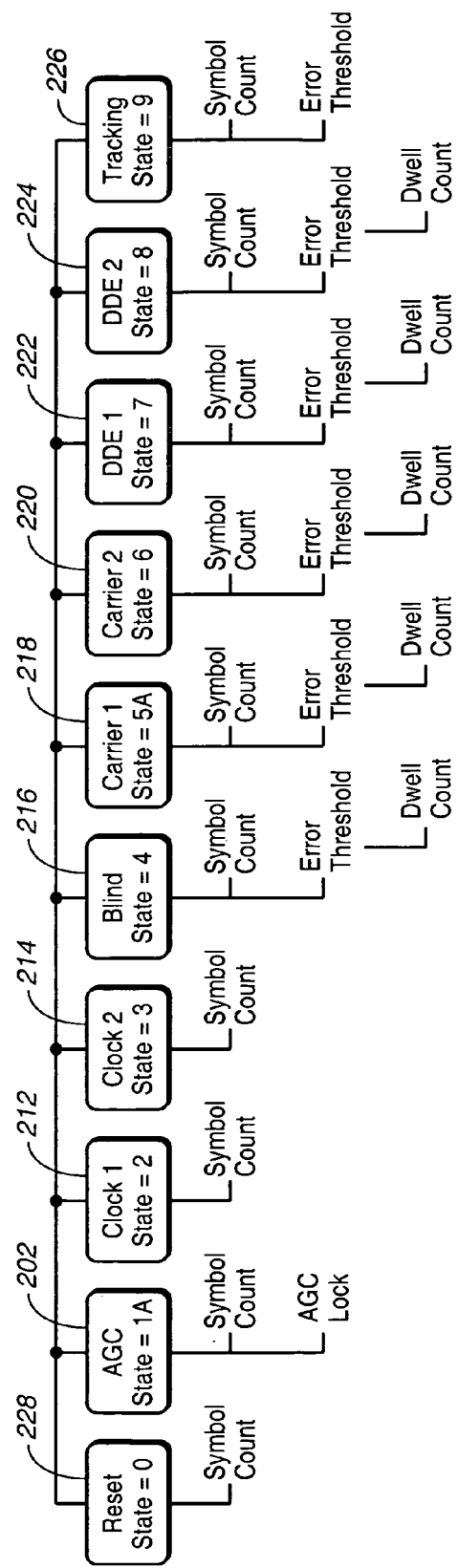
FIG._3

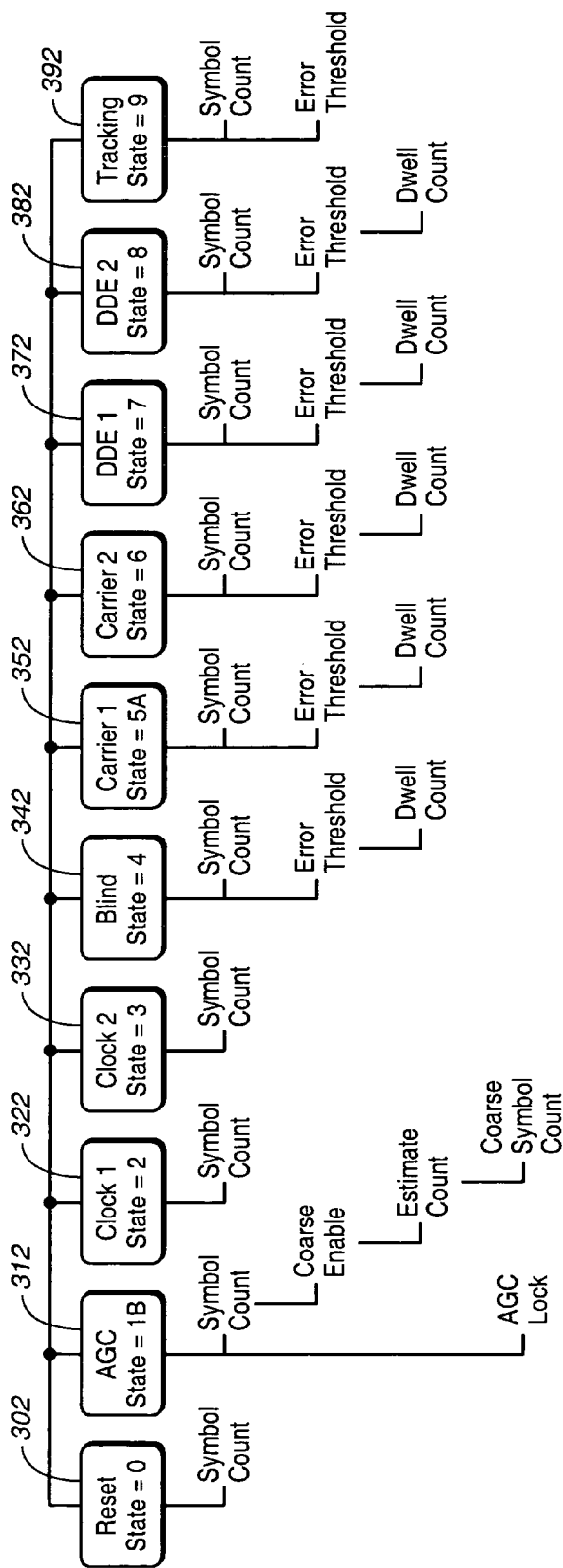
FIG._4

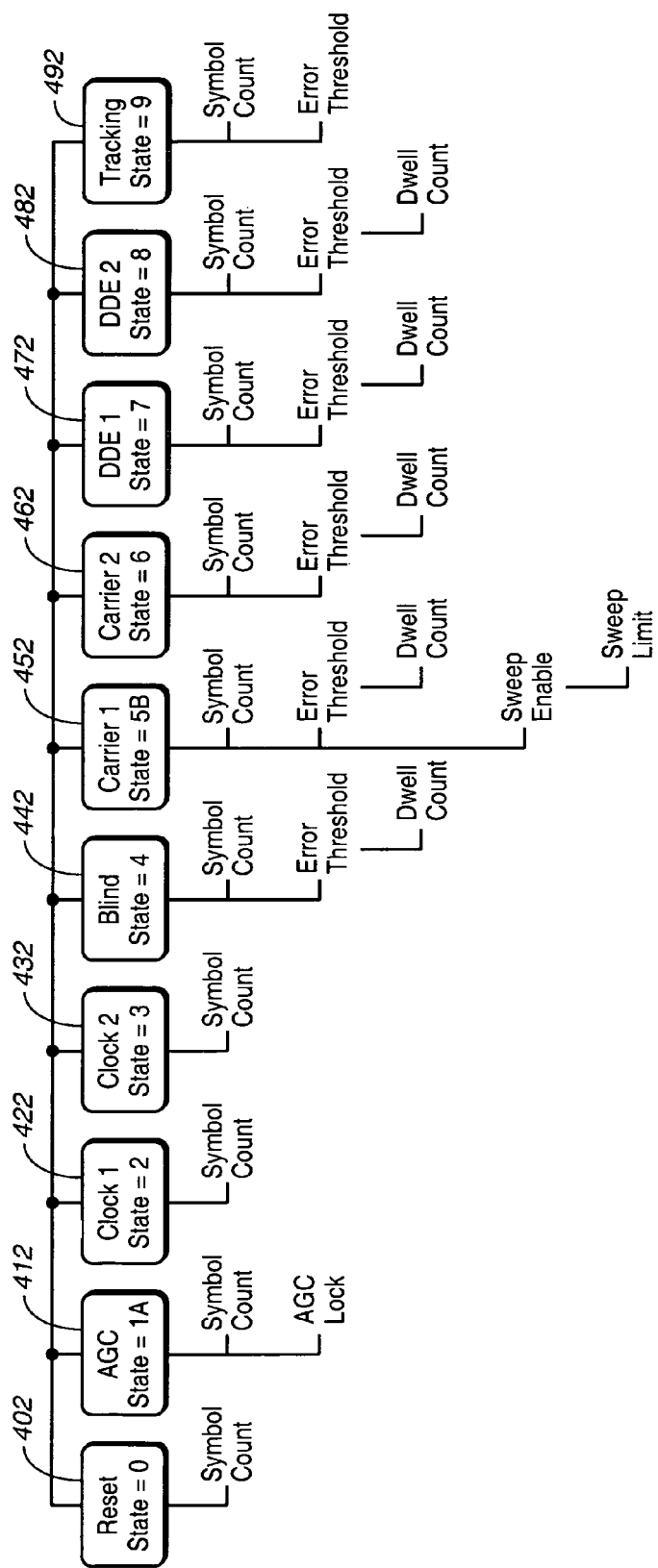
FIG._5

MODES OF OPERATIONS IN QAM MODEMS

This is a divisional patent application for the parent patent application entitled "CONTROL ALGORITHM IN QAM MODEMS", Ser. No. 10/734,415, and filed on Dec. 11, 2003 now abandoned.

FIELD OF THE INVENTION

The present invention is in the field of QAM demodulators. More specifically, the present invention relates to the field of control algorithms for QAM modems.

DISCUSSION OF THE PRIOR ART

Typically, in the prior art, an external Digital Signal Processor (DSP) is used to perform a controlling function for a QAM modem.

However, in order to perform a controlling function for the QAM modem externally, the external DSP controller has to sequentially pull all relevant processing data associated with the QAM modem control function from the QAM modem itself. Thus, it is a Master-Slave model, in which the DSP external controller is a Master device, and the QAM modem is a Slave device. The drawback to this Master-Slave model to control the QAM modem is a high latency of such QAM modem control due to insufficiently efficient physical interface of the external DSP (the Master device) with the QAM modem (the Slave device).

In addition, the prior art external DSP controller of a QAM modem makes the determination of whether a symbol loop of the QAM modem (or a carrier loop of the QAM modem) is locked by looking at all symbol loop parameters (or all carrier loop parameters respectively). This approach has a relatively high probability of a false lock.

What is needed is to realize a QAM modem controlling function internally in order to eliminate the need for an external physical access to the QAM modem thus decreasing the overall QAM modem latency and decreasing the probability of a false symbol loop lock (or a false carrier loop lock).

SUMMARY OF THE INVENTION

To address the shortcomings of the available art, the present invention provides a method and apparatus configured to internally realize a control function for the QAM modem by using a control algorithm embedded in the QAM modem itself. This approach eliminates a need for the physical access to the QAM modem by a controlling device. This results in decreased latency of the QAM modem. In addition, the control algorithm embedded in the QAM modem looks at the ultimate parameters (like a symbol error rate or a constellation error) to determine whether the QAM modem symbol loop (or carrier loop) is locked. The symbol error rate is the best predictor of whether the QAM modem symbol loop (or the QAM modem carrier loop) is locked because it has the least probability of a false lock.

One aspect of the present invention is directed to an internal modem controller.

In one embodiment, the internal modem controller of the present invention comprises: a QAM modem, and a controller embedded in the QAM modem. The controller is configured to control the QAM modem according to a control algorithm. In one embodiment of the present invention, the control algorithm comprises the following steps: (A) Performing an automatic gain control (AGC) operation on an incoming QAM signal to maintain a steady amplitude of the QAM signal; (B) Performing a symbol timing recovery of the input QAM signal by adjusting a sampling clock of the symbol timing recovery loop; (C) Performing a Blind Equalization of the QAM signal without carrier lock to minimize a dispersion error of the received QAM signal constellation as compared with an error-free QAM signal constellation by adjusting a set of coefficients of the equalizer; (D) Performing a carrier recovery of the QAM signal to eliminate a residual carrier frequency error and to eliminate a phase error from the acquired QAM signal; and (E) Performing a decision directed equalization (DDE) of the QAM signal by updating a set of coefficients of the equalizer by using a decision based algorithm.

Another aspect of the present invention is directed to a method of selecting an optimum mode of operation of QAM modem.

In one embodiment, the method of the present invention comprises: (A) using a host interface to select a pair of states, the first state being an initial state; the second state being an intermediate state; and (B) causing a state machine to progress from the initial state to a final state via the intermediate state to optimize the performance of the QAM modem.

In one embodiment of the present invention comprises, the step (A) further comprises: (A1) using a host interface to select a pair of states "1A"; and "5A"; wherein the state "1A" is used to perform automatic gain control (AGC) operation; and wherein the state "5A" is used to perform carrier recovery of an incoming QAM signal. In this embodiment of the present invention comprises, the step (B) further comprises: (B1) causing the state machine to progress from the initial state "1A" to a final state "9" via the state "5A" in order to automatically acquire the incoming QAM signal; and wherein the final state "9" comprises a tracking state used to perform a decision directed equalization (DDE) of the incoming QAM signal; and wherein the state machine utilizes a minimum number of symbols of the incoming QAM signal to complete an acquisition of the incoming QAM signal.

In one embodiment of the present invention comprises, the step (A) further comprises: (A2) using a host interface to select a pair of sates "1B"; and "5A"; wherein the state "1B" is used to perform coarse frequency estimation of an incoming QAM signal; and wherein the state "5A" is used to perform carrier recovery of the incoming QAM signal. In this embodiment of the present invention comprises, the step (B) further comprises: (B2) causing the state machine to progress from the initial state "1B" to a final state "9" via the state "5A" in order to automatically acquire the incoming QAM signal; wherein the final state "9" comprises a tracking state used to perform a decision directed equalization (DDE) of the incoming QAM signal; wherein the coarse frequency estimation of the QAM signal performed in the state "1B" compensates a frequency loop for a long term frequency drift caused by a parameter selected from the group consisting of: {aging, temperature changes, and humidity changes}.

In one embodiment of the present invention comprises, the step (A) further comprises: (A3) using a host interface to select a pair of states "1A" and "5B"; wherein the state "1A" is used to perform automatic gain control (AGC) operation; wherein the state "5B" is used to perform frequency sweep operation that causes a signal frequency of the incoming QAM signal to fall within an acquisition bandwidth of a carrier recovery loop. In this embodiment of the present invention comprises, the step (B) further comprises: (B3) causing the state machine to progress from the initial state "1A" to a final state "9" via the state "5B" in order to automatically acquire an incoming QAM signal; wherein the final state "9" comprises a tracking state used to perform a decision directed equalization (DDE) of the incoming QAM signal.

In one embodiment of the present invention comprises, the step (A) further comprises: (A4) using a host interface to select a pair of sates "1B" and "5B"; wherein the state "1B" is used to perform coarse frequency estimation of an incoming QAM signal; and wherein the state "5B" is used to perform frequency sweep operation that causes a signal frequency of the incoming QAM signal to fall within an acquisition bandwidth of a carrier recovery loop. In this embodiment of the present invention comprises, the step (B) further comprises: (B4) causing the state machine to progress from the initial state "1B" to a final state "9" via the state "5B" in order to automatically acquire an incoming QAM signal; wherein the final state "9" comprises a tracking state used to perform a decision directed equalization (DDE) of the incoming QAM signal; and wherein the state machine utilizes a maximum number of symbols of the incoming QAM signal to complete an acquisition of the QAM signal.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 is a flow chart that depicts a state machine having 10 states that is embedded in the modem and that is utilized to implement the method of the present invention of automatic acquisition of an incoming signal by progressing from an initial state "1" to a final state "9"; wherein state "0" is a reset state.

FIG. 2 shows the topological diagram of the state machine of the present invention whereas the "maximum number of QAM symbols" mode of the state machine of FIG. 1 is selected.

FIG. 3 illustrates the topological diagram of the state machine of the present invention whereas the "minimum number of QAM symbols" mode of the state machine of FIG. 1 is selected.

FIG. 4 is the topological diagram of the state machine of the present invention whereas the "coarse frequency" mode of state machine of FIG. 1 is selected.

FIG. 5 depicts the topological diagram of the state machine when the "QAM signal frequency sweep" mode of state machine of FIG. 1 is selected.

FULL DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIG. 1 is a flow chart 10 that depicts a state machine 12 having 10 states that is embedded in the modem and that is utilized to implement the method of the present invention of automatic acquisition of an incoming signal by progressing from an initial state "1" 14 to a final state "9" 30. State "0" 32 is a reset state and will be discussed below.

In one embodiment of the present invention, the modem comprises a QAM modem.

The modem's input signal is a digital signal stream from a digital source or channel encoder. If the modem's input signal is generated by an analog information source, the signal should be first band limited to a bandwidth of B in a low pass filter (LPF) block, before sampling can take place in an analog to digital converter (ADC) block. According to Nyquist's fundamental theorem, the sampling frequency should be equal to or higher than twice the bandwidth B, that is $f_c \geq 2B$. If this condition is met, the original band limited signal can be recovered from its ($\frac{1}{2}$B)-spaced sampled representation with the aid of a low-pass filter having a cut-off frequency of B. The analog to digital converter (ADC) takes the band limited signal and digitizes it by converting the analog level of each sample to a discrete level. The mapping process that maps the input information bits from the digital source onto the in-phase (I) and quadrature (Q) carriers determines the properties of the modem. The mapping can be represented by the so-called constellation diagram. Due to the instantaneous transitions in the time domain the I-sequence has an infinite bandwidth and would require an infinite channel bandwidth for its transmission. The same is true for Q-component. Thus, I and Q signals are bandlimited before transmission in order to contain the spectrum within a limited band and to minimize interference with other users or systems sharing the spectrum. An ideal linear-phase low pass filter with a cut-off Nyquist frequency of $f_N = f_S/2$, wherein $f_S = 1/T$ is the signaling frequency, and wherein T is the signaling interval duration, would retain all the information conveyed by the quadrature components I and Q within a compact frequency band. Due to the linear phase response of the filter all frequency components would exhibit the same group delay. Because such a filter has a sinc function shaped impulse response with equidistant zero-crossings at the sampling instants, it does not result in inter-symbol-interference (ISI). Once the analog I and Q signals have been generated and filtered, they are modulated by an I-Q modulator. This process allows both I and Q signals to be transmitted over a single channel within the same bandwidth using quadrature carriers. I and Q signals are combined and the combined signal is modulated by a radio frequency in the RF mixer, so that the resulting signal has a carrier frequency suitable for the transmission over the channel. The RF demodulator mixes the received signal down to the IF for the I-Q demodulator, wherein the recovered IF spectrum is similar to the transmitted one but with the additive noise floor. I-Q demodulation takes place in the reverse order to the I-Q modulation process. The signal is split into two paths, with each path being mixed down with IF's that are 90 degrees apart. The recovered I component should be near identical to that transmitted, with the only difference being caused by noise. Once the analog I and Q components is have been recovered, they are digitized by the bit detector in the DEMAP block. The bit detector determines the most likely bit (MLB) transmitted by sampling I and Q signals at the correct sampling instants and compares them to the legitimate I and Q values. The recovered bits are passed to the DAC. If the channel's SNR is high enough, the reconstructed digital signal is identical to the original input signal. Provided the DAC operates at the same frequency and with the same number of bits as the input ADC, the analog output signal after low pass filtering with a cut-off frequency of B in block LPF, is a close replica of the input signal. The right time to sample is a function of the clock frequency at the transmitter. The data clock should be regenerated upon recovery of the carrier. Any error in the clock recovery will increase the BER. Both clock and carrier recovery systems attempt to derive information about timing from the received signal. While carrier recovery is only necessary in a coherent demodulation system, clock recovery is required in all schemes, and accurate clock recovery is essential for reliable data transmission. Clock recovery attempts to synchronize the receiver clock with the baseband symbol rate transmitter clock, wherein carrier recovery endeavors to align the receiver local oscillator with the transmitted carrier frequency. The above-given prior art introduction to the QAM modems can be found in "Modem Quadrature Amplitude Modulation", by W. T. Webb and L. Hanzo, published by Pentech Press Limited in 1994, in Great Britain.

Referring still to FIG. 1, in one embodiment of the present invention, the modem comprises the QAM modem, and the embedded controller is configured to control the QAM modem according to the control algorithm by using the state machine 12. In general, the QAM modem acquires and tracks a signal through an automatic acquisition operation. As was stated above, there are 10 states that define the acquisition operation. Each operating state is defined by control parameters that determine how long to remain in the current operating state and when control is passed to the next state. These control parameters are defined by the user through the host interface. The control parameters are defined for each of the 10 states. (Please, see discussion below). The modem selects each parameter based on its current operating state. The signal is characterized and conditioned through each state until the final idle state "9" is reached. In the event of the loss of signal, the modem re-acquires the signal by cycling back to state "0".

In one embodiment of the present invention, the method of an automated acquisition of a QAM signal is performed by the state machine 12 that uses the control algorithm. In one embodiment of the present invention, the control algorithm comprises at least the following steps:
  (A) Performing an automatic gain control (AGC) operation on an incoming QAM signal to maintain steady amplitude of the QAM signal;
  (B) Performing a symbol timing recovery of the input QAM signal by adjusting a sampling clock of the symbol timing recovery loop;
  (C) Performing a Blind Equalization of the QAM signal without carrier lock to minimize a dispersion error of the received QAM signal constellation as compared with an error-free QAM signal constellation by adjusting a set of coefficients of the equalizer;
  (D) Performing a carrier recovery of the QAM signal to eliminate a residual carrier frequency error and to eliminate a phase error from the acquired QAM signal; and
  (E) Performing a decision directed equalization (DDE) of the QAM signal by updating a set of coefficients of the equalizer by using a decision based algorithm.

In one embodiment of the present invention, the state machine 12 performs the step (A) of an automatic gain control (AGC) operation on an incoming QAM signal to maintain a steady amplitude of the QAM signal while being in state "1" 14.

In the U.S. Pat. No. 6,510,188, entitled "ALL DIGITAL AUTOMATIC GAIN CONTROL CIRCUIT" by Isaksen et al., a digital automatic gain control (AGC) system is fully disclosed. The AGS system, of '188 patent comprises an AGC amplifier configured to scale an input signal by a scale factor, and configured to generate an analog scaled input signal. An analog-to-digital (A/D) converter is configured to sample and convert the analog scaled input signal into a digital scaled input signal. The frequency down converted digital scaled input signal is processed by a power level detector circuit to detect its power level. The logarithmic comparison circuit (LCC) is configured to compare the detected power level of the digital scaled input signal to a predetermined reference signal and configured to generate a digital error signal. Finally, an error processing circuit is configured to process the digital error signal and configured to determine the scale factor of the AGC circuit. The test results show that for any applicable QAM constellation the AGC circuit of the present invention can control the broadest fades (or decreases) in the power level of the input signal with accuracy up to 200 dB/per second. The '188 patent is assigned to the assignee of the present patent application and is incorporated herein in its entirety. The '188 patent provides an enabling disclosure for the AGC operation performed by the state machine 12 in step (A).

Briefly, during this state "1", the power at the output of the Nyquist filter is computed, averaged and compared to a target level that represents the average power in the constellation. The error between the average power in the constellation and the target power level is output to the AGC DAC port to maintain steady signal amplitude. Optionally for this state, a coarse frequency measurement can be performed. This measurement is performed so that corrections can be applied to frequency offsets that occur due to a drift in frequency over a long period of time.

More specifically, referring still to FIG. 1, in one embodiment of the present invention, the state machine 12 enters the state "1A" 14A to perform the step of automatic gain control (AGC) operation. In this embodiment, the step of performing the automatic gain control (AGC) operation further includes the step of computing, averaging and comparing to a target level an output power at Nyquist filter. The output power represents the average power in the QAM signal constellation, wherein an error signal between the average power in the QAM signal constellation and the output target power level is used to maintain steady QAM signal amplitude.

In another embodiment of the present invention, the state machine 12 enters the state "1B" 14B to perform the step of the automatic gain control (AGC) operation. In this embodiment, the step of performing the automatic gain control (AGC) operation further includes the step of performing a coarse frequency estimation of the QAM signal frequency drift over a long period of time to obtain a set of frequency corrections, and to apply the set of frequency corrections to a set of frequency offsets in the coarse frequency loop. The QAM signal frequency drifts over a long period of time due to effects of aging, temperature changes, humidity changes, etc.

The coarse frequency estimate is optional and is selected by the user through the host interface. The three parameters entered by the user for the coarse frequency estimate are as follows: coarse estimate enable flag, coarse estimate count, and coarse symbol count. If the coarse estimate enable flag is set, the coarse estimate is performed. The coarse estimate begins by averaging the input symbols through the front end tuner. The number of symbols to average is determined by the coarse estimate symbol count. This process continues until the threshold number of coarse estimates is exceeded.

More specifically, referring still to FIG. 1, in one embodiment of the present invention, the state machine 12 in state "1" performs four loop tests: the loop test #1 shown in block 34 of FIG. 1, the loop test #2 shown in block 44 of FIG. 1, the loop test #6 shown in block 94 of FIG. 1, and the loop test #7 shown in block 84 of FIG. 1. All loop tests are fully disclosed below.

The next step is the step (B) of performing a symbol timing recovery of the input QAM signal by adjusting a sampling clock of the symbol timing recovery loop.

In the U.S. Pat. No. 6,278,741, entitled "TIMING RECOVERY CIRCUIT IN QAM MODEMS" by Isaksen et al., a timing recovery system and method for QAM signals having different symbol rates are disclosed. After sampling the QAM baseband signal, a symbol timing recovery logic including a generator of a weighting function is utilized to develop a local error signal. The local error signal averaged over a predetermined time period is utilized to make a global decision regarding the sampling point position relative to the baseband signal maximum/minimum. The patent '741 is incorporated by reference herein and is assigned to the assignee of the present patent application. The '741 patent provides the enabling disclosure of the process of the symbol timing recovery used in the step (B) by the control algorithm of the present invention.

In one embodiment of the present invention, the state machine enters the state "2" to perform the step of symbol timing recovery of the input QAM signal. Briefly, in this state "2" the symbol loop process adjusts the sampling clock or the interpolated sample to the ideal sample point. The symbol loop is adjusted by frequency and phase coefficients defined by the user through the host interface. The more specific disclosure of adjusting the sampling clock of the symbol timing recovery loop is given in '741 patent.

The state "2" has two loop tests: the loop test #1 shown in block 34 of FIG. 1, and the loop test #2 shown in block 44 of FIG. 1. All loop tests are fully disclosed below.

In one embodiment of the present invention, the state machine enters the state "3" 18 (of FIG. 1) to optimize the symbol timing recovery of the input QAM signal.

Briefly, during this state "3" the symbol timing recovery is continued. The symbol loop process is the same as for state "2", however, the symbol loop can be re-adjusted for this state for further refinement.

More specifically, the symbol timing recovery of the input QAM signal while state machine stays in state "3" is performed by re-adjusting the sampling clock of the symbol timing recovery loop to optimize the symbol timing recovery of the input QAM signal. In this embodiment of the present invention, the re-adjusting the sampling clock of the symbol timing recovery loop to optimize the symbol timing recovery of the input QAM signal further includes the step of adjusting the set of frequency coefficients and of adjusting the set of phase coefficients of the symbol loop via a host interface, according to '741 patent.

The state "3" has two loop tests: the loop test #1 shown in block 34 of FIG. 1, and the loop test #2 shown in block 44 of FIG. 1. All loop tests are fully disclosed below.

In one embodiment of the present invention, at the next step (C), the control algorithm performs a Blind Equalization of the QAM signal without carrier lock to minimize a dispersion error of the received QAM signal constellation as compared with an error-free QAM signal constellation by adjusting a set of coefficients of the equalizer.

The process of Blind Equalization of the QAM signal without carrier lock is fully disclosed in the U.S. patent application by Isaksen et al., Ser. No. 10/134,224, filed on Apr. 25, 2002, and entitled "FREQUENCY ESTIMATION BASED ON CONSTELLATION ERROR IN QAM MODEMS".

This patent application Ser. No. 10/134,224 is incorporated in its entirety and is assigned to the assignee of the present patent application. The method for frequency estimation in a QAM modem according to the patent application Ser. No. 10/134,224 comprises the following steps: (1) receiving in phase and quadrature components of a QAM symbol from a carrier recovery block; (2) mapping received QAM symbol to a nearest QAM plant point using a slicer; (3) determining an instant error power of the received QAM point; (4) averaging the instant error power over a plurality of incoming QAM symbols in time domain; (5) excluding a DC component from the averaged error power; (6) translating the averaged error power without DC component from time domain into a frequency domain in order to determine the frequency spectrum of the averaged error power; (7) selecting the frequency spectrum component of the averaged error power with the maximum amplitude by using a peak detection; and (8) determining the frequency offset as the maximum frequency spectrum component of the averaged error power.

In one embodiment of the present invention, the state machine 12 (of FIG. 1) enters the state "4" 20 to perform the Blind Equalization of the QAM signal without carrier lock. Briefly, the state machine performs the process of Blind Equalization in state "4" 20 (of FIG. 1) by adapting the equalizer coefficients without carrier lock so that the dispersion error is minimized. The equalizer performs a constant modulus update of the coefficients.

More specifically, in this embodiment, the step of performing the Blind Equalization of the QAM signal without carrier lock further includes the step of substantially continuously performing a modulus update of the set of equalizer coefficients. This step is fully described in the referred above patent application Ser. No. 10/134,224.

The state "4" has four loop tests: the loop test #1 shown in block 34 of FIG. 1, the loop test #2 shown in block 44 of FIG. 1, the loop test #3 shown in block 54 of FIG. 1, and the loop test #4 shown in block 64 of FIG. 1. All loop tests are fully disclosed below.

In one embodiment of the present invention, at the next step (D), the control algorithm performs a carrier recovery of the QAM signal to eliminate a residual carrier frequency error and to eliminate a phase error from the acquired QAM signal.

The method of carrier recovery of the QAM signal to eliminate a residual carrier frequency error and to eliminate a phase error from the acquired QAM signal is fully disclosed in the U.S. Pat. No. 6,904,098. The patent '098 is incorporated in its entirety and is assigned to the assignee of the present patent application. The method of patent '098 comprises the following steps: (A) sampling a QAM signal received from a transmission channel; (B) recovering a symbol clock function from the sampled QAM signal; (C) applying the sampled QAM signal to the adaptive equalizer in order to obtain a QAM equalized signal in a Blind Equalization (BE) mode; (D) using a slicer to locate a nearest plant point for the QAM Blind equalized signal for each recovered symbol clock; (E) using a complex conjugate multiplier to obtain an instantaneous in phase component and an instantaneous quadrature component of a phase angle error signal; (F) using a linear phase detector to obtain an instantaneous phase angle error for each symbol clock; (G) averaging the instantaneous phase angle error signal by using a carrier loop filter; (H) using a complex multiplier to insert an inverse of the averaged phase angle error signal into the QAM Blind equalized signal to compensate for the carrier phase angle error; and (I) repeating the steps (D-H) to close a carrier frequency loop.

The patent '098 provides the enabling disclosure of the process of carrier recovery of the QAM signal to eliminate a residual carrier frequency error and to eliminate a phase error from the acquired QAM signal used by the control algorithm of the present invention.

In one embodiment of the present invention, the state machine 12 of FIG. 1, enters the state "5" 22 to perform the Carrier Acquisition 1. Briefly, during this state "5" the carrier recovery is continued. The carrier loop process eliminates the residual carrier frequency and phase error from the signal. The carrier loop is adjusted by frequency and phase coefficients defined by the user through the host interface. Optionally for this state, a frequency sweep can be performed. The frequency sweep is used if the frequency offset of the signal is greater than the acquisition bandwidth of the carrier recovery loop.

More specifically, in one embodiment of the present invention, the step (D) of carrier recovery of the QAM signal causes the state machine to enter state "5A" 22A to perform carrier recovery of the QAM signal. In this embodiment, the step of performing the carrier recovery of the QAM signal further includes the following steps: adjusting the set of frequency coefficients of the carrier loop, and adjusting the set of phase coefficients of the carrier loop.

In another embodiment of the present invention, the step (D) of carrier recovery of the QAM signal causes the state machine to enter state "5B" 22B of FIG. 1 to perform the step (D2) of carrier recovery of the QAM signal. In this embodiment, if a frequency offset of the QAM signal is greater than the acquisition bandwidth of the carrier recovery loop, the step of performing the carrier recovery of the QAM signal further includes the step of performing a frequency sweep so that the signal frequency falls within the acquisition bandwidth of the carrier recovery loop.

The state "5" has five loop tests: the loop test #1 shown in block 34 of FIG. 1, the loop test #2 shown in block 44 of FIG. 1, the loop test #3 shown in block 54 of FIG. 1, the loop test #4 shown in block 64 of FIG. 1, and the loop test #5 shown in block 74 of FIG. 1. All loop tests are fully disclosed below.

In one embodiment of the present invention, the state machine 12 of FIG. 1, enters the state "6" 24 (of FIG. 1) to perform the Carrier Acquisition 2. Briefly, during this state "6" the carrier recovery is performed. The carrier loop process is the same as for state 5 except for the frequency sweep. The carrier loop can be re-adjusted for this state for further refinement.

More specifically, in one embodiment of the present invention, the step of performing the carrier recovery of the QAM signal while the state machine stays in the state "6" 24 further includes the step of re-adjusting the set of frequency coefficients and the set of phase coefficients of the carrier loop to optimize the carrier acquisition of the QAM signal.

The state "6" has four loop tests: the loop test #1 shown in block 34 of FIG. 1, the loop test #2 shown in block 44 of FIG. 1, the loop test #3 shown in block 54 of FIG. 1, and the loop test #4 shown in block 64 of FIG. 1. All loop tests are fully disclosed below.

Finally, in one embodiment of the present invention, the control algorithm performs the step (E) of decision directed equalization (DDE) of the QAM signal by updating a set of coefficients of the equalizer and by using a decision based algorithm.

The method to perform the step of decision directed equalization (DDE) of the QAM signal by updating a set of coefficients of the equalizer and by using a decision based algorithm is fully disclosed in the referred above patent '098.

In one embodiment of the present invention, the step (E) of performing the decision directed equalization (DDE) of the QAM signal causes the state machine to enter state "7" 26 (of FIG. 1) to perform the step of decision directed equalization (DDE) of the QAM signal. Briefly, during this state "7" the decision directed equalization is performed. The equalizer coefficients are updated by using a decision directed (DDE) algorithm. The decision directed algorithm (DDE) uses a step size coefficient to determine the error feedback from the carrier loop to the equalizer.

More specifically, in this embodiment, the step of decision directed equalization (DDE) of the QAM signal while the state machine stays in state "7" further includes the usage a step size coefficient in the DDE algorithm to determine the error feedback from the carrier loop to the equalizer.

The state "7" has four loop tests: the loop test #1 shown in block 34 of FIG. 1, the loop test #2 shown in block 44 of FIG. 1, the loop test #3 shown in block 54 of FIG. 1, and the loop test #4 shown in block 64 of FIG. 1. All loop tests are fully disclosed below.

In another embodiment of the present invention, the step (E) of performing the decision directed equalization (DDE) of the QAM signal causes the state machine to enter state "8" 28 (of FIG. 1) to perform decision directed equalization (DDE) of the QAM signal. Briefly, during this state "8" the decision directed equalization is continued. The Equalizer coefficients are updated the same way as they were updated when the state machine was in state 7. But, the step size coefficients are readjusted for the state "8" for further refinement of the feedback error.

More specifically, in this embodiment, the decision directed equalization (DDE) of the QAM signal while the state machine is in state "8" further includes the re-adjusting the step size coefficient in the DDE algorithm to optimize the error feedback from the carrier loop to the equalizer.

The state "8" 28 has four loop tests: the loop test #1 shown in block 34 of FIG. 1, the loop test #2 shown in block 44 of FIG. 1, the loop test #3 shown in block 54 of FIG. 1, and the loop test #4 shown in block 64 of FIG. 1. All loop tests are fully disclosed below.

In one more embodiment of the present invention, the step (E) of performing the decision directed equalization (DDE) of the QAM signal causes the state machine to enter a tracking state "9" 30 (of FIG. 1) to perform decision directed equalization (DDE) of the QAM signal.

In this embodiment, the decision directed equalization (DDE) of the QAM signal while the state machine stays in state "9" further includes tracking of the QAM signal by re-adjusting the step size coefficient in the DDE algorithm.

In one embodiment of the present invention, the algorithm employed by the state machine 12 (of FIG. 1) performs the additional step (F) of cycling the state machine 12 back to state "0" 32 to re-acquire a lost QAM signal. The modem also is automatically set to state 0 upon power up. During this state, all soft resets are asserted to zero-out all accumulators and filter delay lines.

For each state, there are control parameters that determine the state to state transition. These parameters are: (a) Minimum Symbol Count, that is the minimum number of symbols that is maintained per state (loop test #1 34); (b) Maximum Symbol Count, that is the maximum number of symbols that is maintained per state (loop test #2 44).

In addition, there are additional control parameters specific for some states that further refine the state to state transition. The additional parameter (c) error threshold: a limit to which the measured constellation error is compared (loop test #3 54). The error threshold is applicable only for states 4 through 9.

The additional parameter (d) dwell count: the number of symbols the error threshold should meet before allowing a state transition (loop test #4 64). The dwell count is applicable only for states 4 through 8.

The additional parameter (e) frequency sweep: frequency parameters that allow the carrier recovery loop to search for frequency offsets beyond the carrier loop acquisition range (loop test #5 74). The sweep frequency operation is applicable only for state 5.

The additional parameter (f) coarse frequency: frequency parameters that allow the front end carrier loop filter to remove frequency offsets due to slowly varying temperature and aging effects (loop test #6 94). The coarse frequency operation is applicable only for state 1.

The additional parameter (g) AGC lock set (loop test #7 84). The AGC lock set is applicable only for state 1.

(Loop Test #1)

In one embodiment of the present invention, a symbol count is maintained for all states, and is incremented for every symbol. Before transitioning to the next state, the symbol count is reset to zero. The symbol count is compared to the minimum symbol count defined by the user (loop test #1). The minimum symbol count is also unique to each state. The symbol count should exceed or be equal to the minimum symbol count before transitioning to the next state.

(Loop Test #2)

In one embodiment of the present invention, the symbol count is also compared to the maximum symbol count. Like the minimum symbol count, the maximum symbol count is unique to each state. If the symbol count exceeds the maximum symbol count (loop test #2), control is transitioned to the next state. The maximum count is used to force the modem to the next state.

(Loop Test #3)

In one embodiment of the present invention, after the final symbol timing is performed in state "3" 18 (of FIG. 1), the constellation error is used to further determine the state to state transition (loop test #3). The constellation error measured in the carrier loop is compared to the error threshold defined by the user. The error threshold is unique to each state. After passing the minimum count comparison, control transitions to the next state if the constellation error is less than the error threshold.

(Loop Test #4)

In one embodiment of the present invention, the dwell count is used to further determine the state to state transition (loop test #4). A dwell count is maintained and incremented for every symbol beyond the minimum symbol count. The dwell count is reset to zero before transitioning to the next state. The dwell count is compared to the dwell count limit defined by the user. The dwell count limit is unique to each state. If the minimum count is met and the error threshold is met, a state transition occurs if the dwell count exceeds the dwell count limit.

(Loop Test #5)

In one embodiment of the present invention, after blind equalization is performed in state "4", the carrier acquisition (in state "5") operates with all the parameters above and optionally with a frequency sweep (loop test #5). The frequency sweep uses 4 parameters for its operation. A frequency sweep enable flag, a frequency sweep delta, and an upper and lower frequency sweep limit is defined by the user and are only used in state "5". Also within state "5", a sweep frequency is maintained and outputted to the carrier loop. The sweep frequency is initially set to the lower frequency sweep limit in state "4". The frequency sweep only takes effect if the maximum symbol count is exceeded. If the maximum symbol count is exceeded and the frequency sweep enable flag is set, the sweep frequency is updated by adding the sweep delta. This process continues until either the error threshold is met or the upper sweep frequency limit is exceeded. If the upper sweep frequency limit is exceeded, the state transitions back to state "0".

(Loop test #6)

In one embodiment of the present invention, the coarse frequency estimate is used to further determine the state to state transition. The AGC mode (state "1") operates with the parameters having minimum and maximum symbol counts and optionally with the coarse frequency estimate (loop test #6). The coarse frequency estimate uses 3 parameters for its operation. A coarse frequency estimate enable flag, the number of estimates limit, and the number of symbols limit is defined by the user and are only used in state "1". Also within state "1", two counts are maintained. The count for the number of symbols for a single estimate is incremented for every symbol. The count for is the number of estimates that are to be summed is incremented for each estimate. The coarse estimate only takes effect if the minimum symbol count is exceeded. If the minimum symbol count is exceeded and the coarse frequency estimate enable flag is set, the symbol count for the number of symbols per estimate is incremented by one and compared to the symbol count limit. If the symbol count is exceeded, the estimate count is incremented by one and compared to the estimate count limit.

(Loop Test #7)

In one embodiment of the present invention, the AGC lock loop test is used to further determine the state to state transition. The AGC mode (state "1") operates with the minimum symbol count and the maximum symbol count and with the AGC lock (loop test #7). If the minimum symbol count is exceeded, the state machine makes transition to the next state if the AGC lock is set. If the estimate count limit is exceeded, a strobe is sent to the CIC coarse measurement loop to capture a coarse frequency measurement.

Another aspect of the present invention is directed to a method of selecting one of four modes of the method of automated acquisition of a QAM signal by employing a state machine 12 (of FIG. 1).

In one embodiment, when the "maximum number of QAM symbols" mode of state machine is selected, as depicted in the topological diagram 100 (of FIG. 2) of the state machine 12 (of FIG. 1), the method of the present invention comprises the following steps: using a host interface to select a pair of states "1B" 102 and "5B" 142, and causing the state machine to progress from the initial state "1B" 102 to the final state "9" 182 via the state "5B" 142 (and via the states "2" 112, "3" 122, "4" 132, "6" 152, "7" 162, "8" 172) in order to automatically acquire the incoming QAM signal. In this embodiment, the step of coarse frequency estimation of the QAM signal performed in the state "1B" 102 compensates a frequency loop for a long term frequency drift caused by a parameter selected from the group consisting of: {aging, temperature changes, and humidity changes}. In this embodiment, the step of frequency sweep performed in the state "5B" 142 causes a signal frequency of the incoming QAM signal to fall within an acquisition bandwidth of a carrier recovery loop. In this embodiment, the state machine utilizes a maximum number of symbols of the incoming QAM signal to complete the acquisition of the QAM signal.

In the "maximum number of QAM symbols" mode of state machine depicted in the topological diagram 100 (of FIG. 2) the number of symbols of the input signal needed to acquire the QAM signal is equal to the sum of the number of symbols required by each state:

$$\text{Maximum Full Symbol Count} = \sum_{i=0}^{i=9} \text{Symbol Count (State} = i); \quad \text{(Eq. 1)}$$

whereas states "1B" and "5B" employ the maximum number of symbols before the state machine transitions to the next state.

In one embodiment, when the "minimum number of QAM symbols" mode of state machine is selected, the topological diagram 200 of FIG. 3 illustrates the particular "minimum number of symbols" mode of operation of the state machine 12 (of FIG. 1). In this embodiment, the method of the present invention comprises the following steps: using a host interface to select a pair of states "1A" 202 and "5A" 218, and causing the state machine 12 (of FIG. 1) to progress from the initial state "1A" 202 to the final state "9" 226 via the state "5A" 218 (and via the states "2" 212, "3" 214, "4" 216, "6" 220, "7" 222, "8" 224) in order to automatically acquire the incoming QAM signal.

In this embodiment, the state machine utilizes a minimum number of symbols of the incoming QAM signal to complete the acquisition of the incoming QAM signal:

$$\text{Minimum Full Symbol Count} = \sum_{i=0}^{i=9} \text{Symbol Count (State} = i); \quad \text{(Eq. 2)}$$

whereas the states "1A" and "5A" employ the minimum number of symbols before the state machine transitions to the next state.

In one embodiment, when the "coarse frequency" mode of state machine is selected, the topological diagram 300 of the state machine is depicted in FIG. 4. In this embodiment, the method of the present invention comprises the following steps: using a host interface to select a pair of states "1B" 312 and "5A" 352, and causing the state machine to progress from the initial state "1B" 312 to the final state "9" 392 via the state "5A" 352 (and via the states "2" 322, "3" 332, "4" 342, "6" 362, "7" 372, and "8" 382) in order to automatically acquire the incoming QAM signal. In this embodiment, during the process of coarse frequency estimation of the QAM signal performed in the state "1B" a frequency loop is compensated for a long term frequency drift caused by a parameter selected from the group consisting of: {aging, temperature changes, and humidity changes}.

Finally, in one more embodiment of the present invention, FIG. 5 depicts the topological diagram 400 of the state machine when the "QAM signal frequency sweep" mode of state machine is selected. In this embodiment, the method of the present invention comprises the following steps: using a host interface to select a pair of states "1A" 412 and "5B" 452, and causing the state machine to progress from the initial state "1A" 412 to the final state "9" 492 via the state "5B" 452 (and via the states "2" 422, "3" 432, "4" 442, and "6" 462) in order to automatically acquire the incoming QAM signal. In this embodiment, the step of frequency sweep performed in the state "5B" causes a signal frequency of the incoming QAM signal to fall within an acquisition bandwidth of a carrier recovery loop.

Configuring the above parameters directly determines how quickly the modem acquires a signal or transitions from state to state. The modem requires that the minimum symbol count, the maximum symbol count, the error threshold, and the dwell count be set. However, the values assigned to these parameters can effectively bypass a state or reduce the amount of time the modem is in that state.

For instance, setting the minimum and maximum symbol count to zero allows the modem to bypass a state. Likewise, setting the error threshold to a low value and the dwell count to zero allows the modem to easily achieve the state conditions and continue with the next state. Practically, the values are dictated by the desired operating conditions and the type of signal to demodulate. The programmability of the modem gives the user a flexible means for achieving a signal acquisition.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An internal modem controller comprising:
   a QAM modem;
   and
   a controller embedded in said QAM modem; said controller is configured to control said QAM modem according to a control algorithm; wherein a state machine having 10 states is embedded in said QAM modem; said control algorithm comprising the following steps:
   (A1) using a host interface to select a pair of states "1B" and "5B"; wherein said state "1B" is used to perform coarse frequency estimation of an incoming QAM signal; and wherein said state "5B" is used to perform frequency sweep operation that causes a signal frequency of said incoming QAM signal to fall within an acquisition bandwidth of a carrier recovery loop;
   (B2) causing said state machine to progress from said initial state "1B" to a final state "9" via said state "5B" in order to automatically acquire an incoming QAM signal; wherein said final state "9" comprises a tracking state used to perform a decision directed equalization (DDE) of said incoming QAM signal; and wherein said state machine utilizes a maximum number of symbols of said incoming QAM signal to complete an acquisition of said QAM signal;
   (C) Performing a Blind Equalization of said QAM signal without carrier lock to minimize a dispersion error of said received QAM signal constellation as compared with an error-free QAM signal constellation by adjusting a set of coefficients of said equalizer;
   (D) Performing a carrier recovery of said QAM signal to eliminate a residual carrier frequency error and to eliminate a phase error from said acquired QAM signal;
   and
   (E) Performing a decision directed equalization (DDE) of said QAM signal by updating a set of coefficients of said equalizer by using a decision based algorithm.

* * * * *